United States Patent [19]

Shtykh et al.

[11] 4,396,780

[45] Aug. 2, 1983

[54] CONTINUOUS METHOD OF PRODUCING POLYETHERS

[75] Inventors: Vladimir S. Shtykh; Alexandr A. Evstratov; Vladimir S. Lebedev; Gleb A. Gladkovsky; Viktor S. Kopenin; Ljudmila P. Gladush; Nikolai V. Kia-Oglu; Mark I. Prigozhin; Jury V. Sharikov; Jury F. Petrov, all of Vladimir, U.S.S.R.; Wolf-Dieter Habicher, Dresden, German Democratic Rep.

[73] Assignees: Vsesojuzny Nauchno-Issledovatelsky Institute Sinteticheskikh Smol, U.S.S.R.; VEB Synthesewerk Schwarzheide, German Democratic Rep.

[21] Appl. No.: 193,290

[22] Filed: Oct. 2, 1980

Related U.S. Application Data

[63] Continuation of Ser. No. 6,039, Jan. 24, 1979, abandoned.

[51] Int. Cl.$^3$ .............................................. L07C 41/03
[52] U.S. Cl. .................................... 568/620; 568/680; 568/623; 568/624
[58] Field of Search ............... 568/620, 623, 624, 680, 568/618

[56] References Cited

U.S. PATENT DOCUMENTS 2,831,034 4/1958 Pruitt et al. .
2,948,757 8/1960 Pruitt et al. .
2,988,572 6/1961 Mills et al. .
3,117,998 1/1964 Cosby et al. .
3,445,525 5/1969 Bormann et al. .
4,110,268 8/1978 Longly et al. .

FOREIGN PATENT DOCUMENTS 1180370 10/1964 Fed. Rep. of Germany .
1382326 11/1964 France .
1079304 8/1967 United Kingdom .
244612 10/1969 U.S.S.R. .

*Primary Examiner*—Howard T. Mars
*Attorney, Agent, or Firm*—Lilling & Greenspan

[57] ABSTRACT

The proposed method resides in that alkylene oxide is subjected to interaction with a polyhydric alcohol in a multisectional reaction zone. A monomer and a polyhydric alcohol are introduced into the first section of the reaction zone, the polyhydric alcohol containing a catalyst in the form of a solution of an alkali metal alcoholate with an alkaline content of 1–20 wt. % as calculated for KOH and with a water content in the solution from 0.05 to 0.5 wt. %. The reaction is conducted in such a way that the initial components interact in the first section at a molar ratio of 1–5:1.

The proposed method makes it possible to produce polyethers that are uniform with respect to the chemical composition (molecular-weight distribution and distribution according to the types of the functionality) and with minimum impurity content. Standardization of the properties and main characteristics of the obtained product allows for more effective development of formulations for compositions of polyurethanes used for manufacturing articles with preset properties.

11 Claims, No Drawings

CONTINUOUS METHOD OF PRODUCING POLYETHERS

This is a continuation of application Ser. No. 6,039, filed Jan. 24, 1979, now abandoned.

FIELD OF APPLICATION

Polyethers (after corresponding purification) are used as main raw material for producing polyurethanes for different purposes, including polyurethane foams, as well as brake fluid components, lubricants, demulsifiers, surfactants, etc.

The technology of polyurethane production imposes the most rigid requirements on the properties of polyethers (in a special-purpose chemical technology there is a grade of raw material, namely, "a product for polyurethane production" which means that it has an improved quality) which must ensure certain properties of an article. This is especially important when formulations are developed for the materials with presct parameters.

One of the most important parameters of polyethers for polyurethane production is a uniform chemical composition including specific (as narrow as possible) distribution with respect to molecular weights (MWD) and to types of the functionality (FTD) of the aligomers whose mixture is a commercial product characterized by an average molecular weight and by an average value of functionality (the number of OH-groups in the molecule).

At present more than 60% of the commercial product is accounted for by polyethers of relatively high molecular weight which are obtained on the basis of triatomic alcohols (triols). Most of said polyethers are used for producing polyurethanes, namely, polyurethane foams.

BACKGROUND OF THE INVENTION

Polyethers used for producing polyurethanes, i.e. meeting the most rigid quality requirements, especially as far as uniformity is concerned with respect to molecular-weight distribution and according to the functionality of the product, can be obtained by a continuous method following known technology.

USSR Inventor's Certificate No. 244,612 describes a process of anionic polymerization run in a counter-flow column apparatus upon contacting a solution of catalyst (for example, glycerate of an alkaline metal in a polyhydric alcohol) delivered in a downward direction (concentration of an alkaline agent is determined by the grade of polyether obtained) with alkylene oxide vapors which are fed into the apparatus from the bottom in excess (usually 20–50%) with respect to the required stoichiometric amount.

The disadvantages of known method are as follows:

(1) Development of industrial column apparatus presents serious problems since the apparatus should possess such incompatible characteristics as laminarity of the downward flow of the liquid phase and uniform stirring thereof in the cross-sectional direction for leveling the reagent concentration and temperature under conditions of exothermal reaction of alkylene oxide polymerization when elimination of excess heat is required, for example, directly through the apparatus walls. The contadictoriness of these requirements becomes more pronounced with increasing size of the apparatus.

(2) Feeding the liquid phase into the apparatus from above always causes a possible "jump" of the part of the liquid through the reaction zone which leads to the appearance of low molecular weight by-products in the final polyether. This possibility increases when alkoxides of alkaline metals and their solutions in polyhydric alcohols are used, with a high content of an alkaline agent (10–20% as calculated for KOH), due to a difference in density of the initial (low-molecular weight) and intermediate (polyether of various molecular weight) products.

(3) High viscosity and density of the initial alkoxide solution and incompatibility thereof with alkylene oxide yield a heterogeneous system at the initial step of the process as a result of which polymerization proceeds only at the interface, which is small when viscosity is high and stirring of the liquid phase inefficient. This calls for a considerable increase in size of that part of the apparatus where the first step of the process takes place.

A second known method, that of U.S. Pat. No. 3,117,998 to Cosby is characterized by the process of anionic polymerization is run in series-connected direct-flow hollow apparatuses upon contacting the initial polyhydric alcohol fed continuously into the bottom part of the first apparatus, alkylene oxide introduced continuously into the bottom part of each of the apparatuses (in 25–150% excess by weight of the oxide reacting in each apparatus), and solid alkali (KOH) introduced intermittently into the first or into the rest of the apparatuses as well from above on a perforated grate (or net) immersed into the reaction mixture. This method is free from disadvantages inherent in first one cited above but has its own drawbacks:

(1) According to this method, only alkali and not alkoxide must be used as a catalyst.

Alkali in the reaction mixture reacts with alkylene oxide to inevitably form diols; polyethers uniform in functionality cannot be produced according to said method for average functionality higher than 2.

(2) Stepwise addition of solid alkali requires constant operator control and causes fluctuations in the catalyst concentration during the reaction; all this affecting the main process kinetics. Furthermore, the unit for feeding alkali must be too bulky to meet sealing requirements for the whole apparatus.

(3) A small amount of series-connected apparatuses (4–6), in spite of the large height, as compared with diameter, cannot ensure short residence time of the reagents in the reaction zone. As a result the final product contains both low- and high-molecular weight components.

(4) Starting the apparatus requires each column to be previously filled with intermediates having an appropriate average molecular weight, each intermediates being obtained in a batch reactor.

It is an object of the invention to eliminate the above disadvantages. Another object of the invention is to provide a continuous method of producing polyethers more uniform in chemical composition (molecular-weight distribution and distribution with respect to functionality types).

It is also an object of the invention to provide a method of producing polyethers whose realization does not require complex technological and auxiliary equipment.

Still another object of the invention is to provide a method of producing polyethers whose technological parameters, especially at the initial step, can be easily and simply regulated.

BRIEF DESCRIPTION OF THE INVENTION

Said objects are accomplished in a proposed continuous method of producing polyethers realized by interacting alkylene oxide with polyhydric alcohol in the presence of an alkaline catalyst. According to the invention, the reaction of interaction is run in a reaction zone divided, at least, into six sections, a monomer and a polyhydric alcohol being introduced into the first section in the upward direction. The polyhydric alcohol contains a catalyst in the form of a solution of an alkaline metal alkoxide with alkaline content of 1–20 wt.% as calculated for KOH and with a water content in the solution from 0.05 to 0.5 wt%. The reaction is run in such a way that in the volume of the first section, alkylene oxide and polyhydric alcohol interact at a molar ratio 1–5:1; the obtained product being purified or subjected to interaction with another portion of alkylene oxide and subsequent purification with the formation of polyethers in the form of block-copolymers of the alkylene oxides used.

Realization of the proposed method is effective as far as the following parameters of the process are concerned:

production by a continuous method of the product of uniform chemical composition (molecular-weight distribution and distribution with respect to the functionality types); the product thus obtained virtually does not differ in these parameters from the product obtained by a batch process. Standardization of the properties and principal characteristics allows for more effective development of the polyurethane formulations, especially of polyurethane foams, used for manufacturing articles with preset properties;

a considerable decrease in the number of main technological apparatuses due to a possibility of using one multi-sectional apparatus instead of several (no less than 6) separate apparatus;

a corresponding decrease in the number of auxiliary equipment (metering pumps, collectors, condensers);

a decrease in size of the condensers itself due to a 4–5-fold decrease of the amount of unreacted alkylene oxide vapors;

simplification of the system of controlling the parameters of the process at the initial step and in the whole apparatus due to homogeneity of the reaction mixture at all stages which ensures a steady reaction character, improves the quality of the obtained product, and stabilizes the main quality parameters with time.

According to the present invention, it is expedient to introduce alkylene oxide into one or several sections of the reaction zone in excess amounting to 25–50 wt.% of the total stoichiometric amount.

For a better understanding of other objects and advantages of the present invention, a detailed description of a continuous method of producing polyethers and specific examples of realizing the method are given hereinbelow by way of illustration.

DETAILED DESCRIPTION OF THE INVENTION

An initial components in producing polyethers, according to the present invention, use is made of polyhydric alcohols usually used for obtaining polyethers for polyurethane production by a periodic method, namely: diethyleneglycol, glycerin, trimethylpropane, hexanetriol and other, preferably liquid at operating temperature, alcohols (with increasing assortment of polyethers for polyurethane production, that of the used polyhydric alcohols also varies). The most widely used alkylene oxide is ethylene or propylene oxide, butylene oxide being used more rarely. According to the present invention, the catalysts are applied which, upon anionic polymerization of alkylene oxides, are alkoxides of alkaline metals (usually K, Na, and more rarely Cs). In accordance with the present invention, the ions of the alkaline metals are introduced into the reaction zone in the form of a solution of alkoxides of these metals in the initial polyhydric alcohol similar to the initial one. Such a solution is obtained by dissolving metal K, Na, and Cs or their hydroxides (the latter being much less hazardous and most widely used in industry) in a selected polyhydric alcohol, filtering an obtained solution, and removing the water from the solution, said water being formed as a result of interacting the alcohol with hydroxide or being present (introduced) in the initial components. The content of the ions of the alkaline metal is determined in weight % as calculated for the corresponding hydroxide (KOH, NaOH, or CsOH). The upper limit of the content (no more than 20 wt.% as calculated for KOH) is determined first, by a sharp increase in viscosity of the obtained solution and correspondingly by difficulties arising upon drying, transportation, storage, and metering of the solution, and, second, by a maximum content of the alkaline component in the reaction mixture, delivered for subsequent purification and drying, at which purification is still economic (as a rule, the reaction mixture delivered for purification contains up to 0.5–0.8 wt.% of the alkaline component). A minimum content of the alkaline component is determined by the direct relationship between the anionic polymerization rate and its concentration in the reaction mixture and affects the efficiency of the apparatus in which polymerization proceeds. From the economic standpoint it is inexpedient to have a minimum concentration less than 1 wt.% as calculated for KOH, when operating temperatures and pressures are equal to those accepted for the process of anionic polymerization (for NaOH the minimum content is even higher because of a lesser catalytic activity of $Na^+$).

The upper limit of the moisture content in the solution used (0.5 wt.%) is determined by a permissible part of diol components in the end product. This part can vary depending on the molecular weight of the product and field of its application.

The lower limit of the moisture content is determined by the efficiency of the process of drying the initial solution (and often by technological possibilities of the equipment used) and is about 0.05 wt.%.

For realizing the method of producing polyethers, according to the present invention, use can be made of a vertical direct-flow bubbling apparatus of known construction (used, for example, for chlorinating hydrocarbons and for other successive reactions) whose reaction volume is divided into sections by perforated partitions in such a way that the vapors of alkylene oxide bubbling through the reaction mass stir it intensively in each section and after re-distribution pass through the holes in the partition into the next section thus hindering the passage of the reaction mass through the same holes in the partition in the opposite direction. Thus, the apparatus consisting of the several sections is a set of cells with ideal mixing through which the reaction mass goes in the upward direction.

The intensity of stirring in each section is determined both by the ratio between the geometrical size of the section (as is known the height to diameter ratio in such a section upon stirring with bubbling vapors and gases must be within the limits 1.5-2.5) and by the rate of passing vapors through the section. The rate must be from 0.7 to 1.5 m/sec as calculated for the total cross-section of the apparatus. Alkylene oxide vapors introduced into the first section partly dissolve in the reaction mixture and interact with liquid intermediates; then they pass through all the sections and the excess of the vapours passing through the partition of the last (upper) section must be within the range 25-50 wt.% (depending on the temperature of the vapors and the grade of the polyether obtained) of stoichiometric amount of alkylene oxide (as calculated for the product with preset molecular weight in the whole volume of the apparatus).

As is known from the theory of chemical reactors, a sufficiently short residence time of the particles of the liquid phase in a set of the cells of ideal stirring can be achieved when the number of the cells is no less than 6 (preferably 10-12). The construction of the apparatus easily meets this requirement and apparatuses with 12-15 sections can be used for practical purposes.

The process of producing polyethers, according to the present invention, can be accomplished in the above-described apparatus, into the first section of which vapors of alkylene oxide are introduced continuously (or liquid propylene oxide evaporating in the section volume) and the solution of alkaline metal alkoxide in the corresponding polyhydric alcohol. The alkylene oxide vapors stir the alkoxide solution, partly dissolve in it (in accordance with the operating temperature and pressure), and react with the formation of low-molecular products which are mixed with a continuously fed fresh alkoxide solution. Since the viscosity of the initial alkoxide solution can be sufficiently high, whereas the solubility of alkylene oxide in it is very small, the reaction of interacting alkylene oxide with polyhydric alcohol proceeds only at the interface and propagates into the bulk only when a certain value of the average molecular weight of the reaction mixture is attained in the bulk. The molecular weight value depends on the nature of the initial polyhydric alcohol, on the content of an alkaline component in the alcohol, and on the nature of the alkylene oxide used. The laboratory study has shown that on the basis of diethyleneglycol, glycerin, trimethylpropane, as well as oxides of propylene and ethylene (at their different ratio) multicomponent systems can be obtained containing polyhydric alcohol, alcoholate (only two potassium alkoxides were investigated) and low-molecular products of addition of alkylene oxides to the corresponding alcohol. These systems are sufficiently (no less than 3-4% of the total weight of the system) compatible with the oxides whereas polyhydric alcohols and, in particular, solutions of potassium alkoxides in the corresponding alcohols form homogeneous (monophase) systems with oxides, the oxide content being no more than 0.1-0.2 wt.%, within 40°-60° C., which is insufficient for ensuring any noticeable reaction rate.

This accounts for the so-called induction period observed at the beginning of the process when realizing the batch method of producing polyethers; during this period no addition of oxide to the alkoxide solution (or solid alkali) takes place. It has been found that in all cases an average molecular weight is obtained when 1-5 moles of alkylene oxide are added to 1 mole of the polyhydric alcohol which ensures homogeneity of the reaction mixture and uniform proceeding of interaction of alkylene oxide with polyhydric alcohol (in the presence of alkaline metal ions) in the whole volume of the first section. This significantly simplifies the problem of maintaining the temperature in the first and neighboring sections without complex systems of automatic control and stabilizes the whole process.

Particular values of the parameters of the process, which are to be kept at the initial step of the process (in the first section of a direct-flow bubbling sectioned reactor), must be determined on the basis of data on the kinetics of the process, namely, kinetics of the chemical reaction itself and that of the process of mass transfer which ensure in the reaction mixture a certain operating concentration of alkylene oxide. If the chemical reaction rate is described by the equation $$\frac{dN_{AO}}{d\tau} = K_x[AO][RO^-] \cdot V \quad (1)$$

and the rate of mass transfer by the equation $$\frac{dG_{AO}}{d\tau} = \beta F(C_{AO} - C'_{AO}) \quad (2)$$

the conditions which ensure the addition of 1-5 moles of alkylene oxide to 1 mole of polyhydric alcohol can be chosen by solving equations (1) and (2) and using other data characterizing the apparatus as a whole (the volume of one section, preset capacity with respect to a definite product, characteristics of perforations in dividing and distributing partitions, linear velocity of the alkylene oxide vapors along the whole cross-section of the apparatus, type and properties at an operating temperature of the selected polyhydric alcohol or of the alkoxide solution used, and other less important factors).

In the above formulae the following designations are used:

$N_{AO}$—the number of alkylene oxide moles;
$\tau$—time;
$dN_{AO}/d\tau$—the rate of introducing alkylene oxide into the reaction;
$G_{AO}$—the weight of alkylene oxide;
$K_x$—the rate constant of chemical reaction (addition of alkylene oxide) of the second order;
[OA]—the mole concentration of alkylene oxide in the bulk of liquid phase;
[RO$^-$]—the molar concentration of active centers to which alkylene oxide is added practically equal to concentration of the ions of the alkaline metal;
V—the volume of the liquid phase for the given (first in this case) section of the apparatus;
$\beta$—the mass transfer coefficient for the process of alkylene oxide transition from the vapor into the liquid phase;
F—the surface area of the contact of alkylene oxide vapors with liquid phase in which the oxide dissolves;
$C_{AO}$—the concentration of alkylene oxide in the liquid phase equilibrium with alkylene oxide vapors over the surface of the liquid phase (at operating temperature and pressure);
$C'_A$—the operating concentration of alkylene oxide in the liquid phase determined by the ratio between the rates of mass transfer and consumption of alkylene oxide (chemical interaction).

The product formed in the first section passes through the holes in the preferred partition (as well as an excess of vapors of alkylene oxide) into the next section where an intensive stirring of the reaction mixture with vapors of alkylene oxide occurs in the whole volume of the section and where a part of the vapors dissolves in the reaction mixture and interacts with a polyhydric alcohol (with an intermediate molecular weight different from the initial). The described process repeats in all sections of the apparatus. From the last section an excess of alkylene oxide vapors (25-50% of stoichiometric quantity) goes into a separate condensate tube for condensation while the reaction mixture containing the product with an average preset molecular weight and residual alkylene oxide in an amount of 0.05 to 0.1% by weight (which is ensured by an average residence time of the liquid in the apparatus and by operating temperatures and pressure in it) is delivered for purification (for example, with acids or sorbents), filtration and drying, or can be delivered into a similar apparatus (also divided into sections) for interaction with alkylene oxide of another type due to which a block-copolymer of two alkylene oxides can be obtained. For instance, polyether can be obtained on the basis of glycerin and propylene oxide in one apparatus and then additional interaction with ethylene oxide can be performed in the second apparatus thus yielding the so-called activated polyether widely used recently. In this case an excess of alkylene oxide from the second apparatus is condensed separately and the reaction mixture containing the block-copolymer goes for purification, filtration and drying.

EXAMPLE 1

A potassium glycerate solution in glycerin with a total alkaline content of 11.6 wt.% as calculated for KOH and water content of 0.5 wt.% according to Fischer is fed into the bottom (first) section of the reactor in the amount of 0.9 kg/hr. The total alkaline content value in the initial solution is calculated proceeding from the condition that the final product delivered for purification must have the total alkaline content no more than 0.4 wt.% at an average molecular weight of the purified polyether of 3200±200 in accordance with specifications for a commercial product obtained by the batch process. The reactor has the following parameters:

total number of sections—16
diameter of the section:

| No. 1-6  | 100 mm |
| No. 7-16 | 250 mm | height of the section—(2.3-2.4) of the diameter surface area of the clear opening of the holes in perforated dividing partitions—1.0-1.2% of the total cross-section surface area of the section.

Propylene oxide is fed in the form of overheated vapors under the distributing grate of the first section in amounts of 12.5 kg/hr and into the 7-th section an additional amount 41.5 kg/hr is delivered. During the process a temperature of 115° C. (in sections 1-6) and 120° C. (in sections 7-16) is maintained and a pressure up to 0.1 at. ga. is kept at the exit of the alkylene oxide vapors from the apparatus. The pressure in the first section was 1.0-1.1 at. ga. and remained constant during the experiment. The conditions selected for the first section of the apparatus (the size of the section and parameters of the initial potassium glycerate solution being given) ensure the addition to 1 mole of glycerin of about 4 moles of propylene oxide. An average molecular weight of the intermediate product formed is 320. After purification, filtration and drying the product has the following parameters:

| molecular weight (with respect to hydroxyl groups as calculated for triol) $\overline{M}_{OH}$ | 3,400 |
| OH—group content | 1.5 wt. % |
| iodine number | $1.1 \frac{\text{g of iodine}}{100 \text{ g}}$ |
| polydispersity coefficient $\frac{\overline{M}_w}{\overline{M}_n} = 1.03$ | |
| content of monools | 3-4 wt. % |
| content of diols | 6-7 wt. %. |

Distribution with respect to funtionality was determined by adsorption chromatography on alumina; distribution with respect to molecular weights was determined by the method of gel-penetrating chromatography.

The product obtained from the similar raw material in the batch apparatus has $M_{OH}=3,200$, $\overline{M}_w/\overline{M}_n=1.02$ with monool content 3-5 wt.% and diol content 5-7 wt.%.

The conditions of processing and properties of flexible slabstock polyurethane foams obtained on the basis of both polyethers were almost identical.

EXAMPLE 2

A potassium glycerate solution in glycerin is fed into the first section of the reactor, similar to that described in Example 1, at a flow rate 0.78 kg/hr. Total alkaline content of the solution is 11.7 wt.% as calculated for KOH; water content is 0.39 wt.% according to Fischer.

Ethylene oxide vapors are fed at a flow rate of 5.9 kg/hr under the distributing grate of the first section. A temperature of 85±5° C. is maintained in all sections of the reactor; a pressure at the exit of an excess of ethylene oxide vapors is 0.03 at. ga. In the first section of homogeneous reaction mixture is formed with an average molecular weight corresponding to the addition of about 3 moles of ethylene oxide to 1 mole of glycerin. A intermediates (alkaline content 2.2 wt.% as calculated for KOH and $M_{OH}$ 560) is discharged from the 6-th section of the apparatus and delivered into the first section of the second apparatus of the similar construction, under the distributing grate of the section the propylene oxide vapors being introduced. At a temperature of 118±2° C. and a pressure at the exit of an excess of propylene oxide vapors 0.03-0.04 at. ga. an alkaline product is obtained with a total alkaline content 0.33 wt.% containing a block copolymer. The parameters of the product after purification, filtration, and drying are as follows:

| content of OH—groups | 1.64 wt. % |
| $M_{OH}$ | 3100 |

| iodine number | $1.3 \frac{\text{g of iodine}}{100 \text{ g}}$ |

The parameters characterizing the degree of polydispersity of the product and distribution with respect to the types of functionality were similar to those of the product obtained by following the procedure described in Example 1. The product thus obtained was processed into flexible slabstock polyurethane foam under standard conditions.

EXAMPLE 3

A solution of potassium alkoxide in glycerin with a total alkaline content of 11 wt.% and water content of 3.4 wt.% (without distilling off the water from the solution of solid alkali in glycerin) was used under the conditions similar to those described in Example 1. An alkaline product has an alkaline content of about 0.33 wt.% but a lower molecular weight as calculated for triol ($M_{OH}$=2900) since the content of diols was 17-20 wt.%, the content of monools being the same (about 3 wt.%).

EXAMPLE 4

A solution of potassium glycerate in glycerin with a total alkaline content of 19.7 wt.% (as calculated for KOH) and water content of 0.4 wt.% (according to Fischer) is fed in amounts of 0.84 kg/hr into the first (bottom) section of the apparatus similar to that described in Example 1. Under the distributing grate of the section, the vapors of propylene oxide are introduced in amounts of 24.5 kg/hr. After filling the bottom (No. 1-7) sections of the apparatus at a temperature of 115±2° C. and a pressure in the first section of 0.8-0.9 at. ga., additional amounts of 45.5 kg/hr of propylene oxide are introduced into the 7-th section (in the form of vapors); the process is run upon maintaining in the upper sections (No. 8-16) a temperature of 120±1° C. and a pressure of 0.05-0.07 at. ga at the exit of the excess of propylene oxide vapors. An alkaline product leaving the 16-th section has an alkaline content of 0.42-0.45 wt.% (as calculated for KOH) and an average molecular weight 4500-4600 (the capacity of the apparatus with respect to this intermediate product is about 40 kg/hr) is delivered to the second reactor (for obtaining block-copolymer with ethylene oxide) operating at 90±2° C.; under the distributing grate of the first section of the second reactor the vapors of ethylene oxide are fed (7.2 kg/hr). An alkaline product with alkaline content of 0.35-0.36 wt.% is discharged from the 6-th section of the apparatus in the amount about 45 kg/hr. After purification, filtration, and drying, the product has the following parameters:

| OH groups content | 1.04 wt. % |
| --- | --- |
| $M_{OH}$ (as calculated for triol) | 4900 |
| iodine number | $1.7 \frac{\text{g iodine}}{100 \text{ g}}$ |

The polyether thus obtained was processed into flexible cold molding polyurethane foam. An attempt to use a solution of potassium alkoxide in glycerine with a KOH content of 20.8 wt.%, in order to obtain polyether with an average molecular weight 5500 was unsuccessful since it was difficult to meter the solution (it was required to heat the reservoir, pipelines, and pump housing up to 85°-90° C.) and impossible to start the apparatus because of a high viscosity of the liquid which hindered the stirring with vapors of propylene oxide, heating up to operating temperature, and mass transfer of the oxide from a vapor to liquid phase. However, it should be noted that the use of alkoxide solutions with an elevated content of an alkaline agent, for example upon producing polyethers of high molecular weight is not typical of the batch process.

EXAMPLE 5

A solution of potassium alkoxide in diethyleneglycol (0.6 kg/hr) with a total alkaline content 1.2 wt.% as calculated for KOH is introduced into the first section of the apparatus similar to that described in Example 1; under the distributing grate of this section the vapors of propylene oxide in amounts 12.5 kg/hr are fed. 2.8 kg/hr of the product with alkaline content of 0.27 wt.% (as calculated for KOH) are discharged from the 6-th section of the apparatus, the temperature in the sections being 120±1° C. In the first section 1 mole of propylene oxide is added to 1 mole of diethyleneglycol. After purification, filtration, and drying, polyether has the following parameters:

| $M_{OH}$ | 270 |
| --- | --- |
| iodine number | $0.6 \frac{\text{g of iodine}}{100 \text{ g}}$ |
| polydispersity coefficient $\overline{M}_w/\overline{M}_n$, | 1.03 |

The product is used in formulations for manufacturing rigid polyurethane foams which have the properties similar to those of polyurethane foams obtained from the product produced by the batch process.

EXAMPLE 6

A solution of sodium glycerate in glycerin with a total alkaline content of 11.5 wt.% (as calculated for NaOH) and water content of 0.38 wt.% (according to Fischer) is used under conditions similar to those described in Example 1. The amount of propylene oxide vapors delivered into the 7-th section is 20.5 kg/hr. The product discharged from the 16-th section has the following parameters after purification, filtration, and drying:

| $M_{OH}$ | 2300 |
| --- | --- |
| iodine number | $1.95 \frac{\text{g of iodine}}{100 \text{ g}}$ |
| polydispersity coefficient, $\overline{M}_w/\overline{M}_n$, | 1.027 |

EXAMPLE 7

A solution of potassium glycerate in glycerin with a water content of 0.054 wt.% (according to Fischer) was used under the conditions similar to those described in Example 1.

The operation of the apparatus was not changed; the capacity slightly increased which may also be due to the accuracy of maintaining the temperature. After purification, filtration, and drying the product has the following parameters:

| | |
|---|---|
| $M_{OH}$ | 3560 |
| content of OH—groups | 1.43 wt. % |
| iodine number | $1.12 \frac{\text{g of iodine}}{100 \text{ g}}$ |
| polydispersity coefficient, $M_w/M_n$ | 1.026 |
| content of monools | 3-4 wt. % |
| content of diols | 5-6 wt. % |

As is seen, the content of diols in the final product is somewhat decreased, but the conditions of purification and the presence of water (even within the limits accepted for the high grade propylene oxide) in the initial propylene oxide do not allow for producing the product with the diol content less than 4-5 wt.%. More careful drying of the alkoxide solution also encounters difficulties such as elevated temperature and high vacuum which are not always obtainable under industrial conditions and adversely affect the properties of the polyhydric alcohol. It should be noted that modern requirements imposed upon the quality of polyethers admit the presence of diols (and monools) in triols in amounts attained when performing the batch and the proposed continuous processes.

What is claimed is:

1. In a continuous process for the production of polyethers via the catalytic reaction of an alkylene oxide with a polyhydric alcohol, the improvement which comprises conducting the reaction in a vertical, direct flow reactor having at least 6 sections, each of which is separated by perforated partitions, at a temperature of about 85° C. to 120° C., wherein the catalyst is a solution of an alkaline metal alkoxide selected from the group consisting of potassium, sodium, or cesium, in the polyhydric alcohol with an alkaline content of 1.0 to 20 wt.% as calculated for the corresponding hydroxide, and a water content of from 0.05 to 0.5 wt.%, wherein alkylene oxide vapors and a solution of the catalyst in the polyhydric alcohol are continuously introduced in an upward direction in the first reactor section at a rate ensuring reaction between 1 to 5 moles of alkylene oxide and one mole of polyhydric alcohol in the first reactor section, and a polyether of uniform chemical composition being produced at the outlet of the reactor; and wherein the movement and homogeneity of the reaction mass in all reactor sections is maintained by a sufficient flow rate of alkylene oxide vapor introduced into one or several sections of the reactor in amounts of 25 to 50% in excess of the stoichiometric amount necessary to react with the polyhydric alcohol.

2. The process of claim 1, wherein the ratio of the height to the diameter of each reactor section is within the limits of 1.5 to 2.5.

3. The process of claim 1, wherein the flow rate of alkylene oxide vapor varies from about 0.7 to 1.5 meters/second based upon the cross section of the reactor.

4. The method of claim 1, wherein the alkaline metal alkoxide is potassium.

5. The method of claim 1, wherein the polyether product is further reacted with another alkylene oxide in a second reactor of the same construction.

6. The method of claim 1, wherein said polyhydric alcohols are selected from the group consisting of diethyleneglycol, glycerin, trimethylolpropane, and hexanetriol.

7. The method of claim 1, wherein the alkylene oxide is selected from the group consisting of ethylene oxide, propylene oxide, and butylene oxide.

8. The method of claim 1, wherein the alkaline metal alkoxide catalyst is selected from the group consisting of potassium alkoxide, sodium alkoxide, and cesium alkoxide.

9. The method of claim 1, wherein the number of reactor sections varies from 10 to 12.

10. The method of claim 1, wherein the number of reactor sections varies from 12 to 15.

11. The method of claim 1, wherein the number of reactor sections is 16.

* * * * *